July 28, 1970  G. C. BREWIN ETAL  3,521,926
FOLDING RIGID-WALLED CABIN

Filed Oct. 31, 1968  5 Sheets-Sheet 1

INVENTORS
GLENDON C. BREWIN
PETER M. BREWIN

BY  *Warren W. Kurz*
AGENT

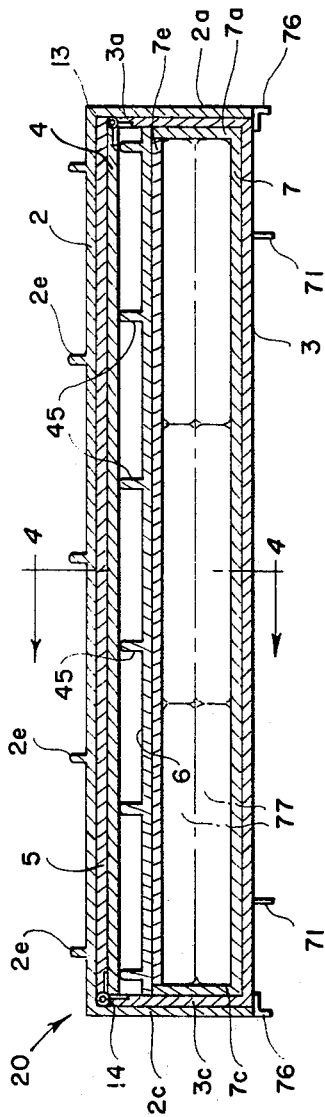
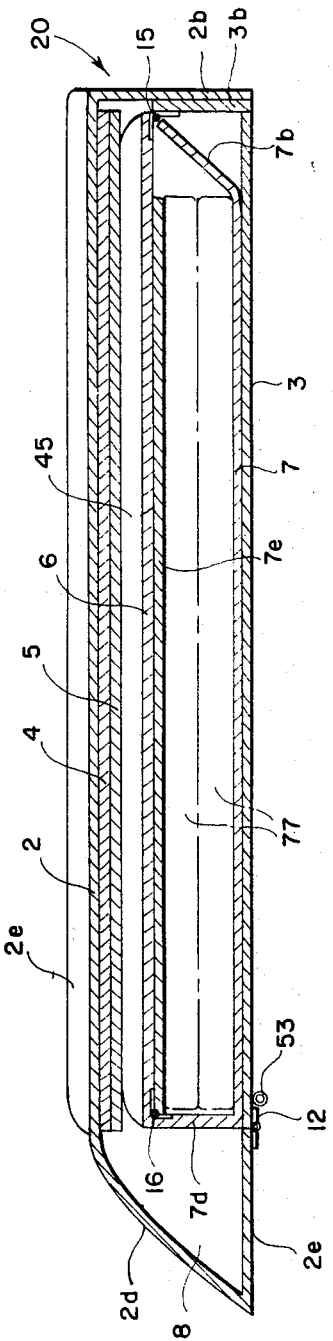

INVENTORS
GLENDON C. BREWIN
PETER M. BREWIN

BY

Warren W. Kurz
AGENT

July 28, 1970     G. C. BREWIN ET AL     3,521,926
FOLDING RIGID-WALLED CABIN
Filed Oct. 31, 1968     5 Sheets-Sheet 4

INVENTORS
GLENDON C. BREWIN
PETER M. BREWIN

BY Warren W. Kurz
AGENT

INVENTORS
GLENDON C. BREWIN
PETER M. BREWIN

United States Patent Office 3,521,926
Patented July 28, 1970

3,521,926
FOLDING RIGID-WALLED CABIN
Glendon C. Brewin, 262 W. Mill Road, Northfield, N.J.
08225, and Peter M. Brewin, 2400 Queens Chapel,
Apt. 810, Hyattsville, Md. 20782
Filed Oct. 31, 1968, Ser. No. 772,309
Int. Cl. B60p *3/34*
U.S. Cl. 296—27                                    7 Claims

ABSTRACT OF THE DISCLOSURE

A foldable rigid-walled cabin capable of being transported atop the roof of a standard-sized automobile when in a folded state. The cabin is folded in such a manner as to permit lateral unfolding thereof subsequent to detachment from the automobile roof.

CROSS-REFERENCE TO RELATED APPLICATION

Reference is made to the following copending application:

U.S. patent application Ser. No. 585,187, entitled "Folding Camper," filed Oct. 7, 1966, in the name of Glendon C. Brewin, now abandoned.

BACKGROUND OF THE INVENTION

Field of the invention

The present invention relates to portable shelters of the type used by the camping community and in particular to rigid-walled cabins which may be compactly folded to form a package of a size readily transportable on the roof of a standard-sized automobile.

Description of the prior art

In U.S. patent application Ser. No. 585,187, filed on Oct. 7, 1966, by Glendon C. Brewin, a collapsible rigid-walled camping cabin is disclosed which, when in a folded condition, is readily transportable atop the roof of a standard-sized automobile. When in a folded condition, the walls and the floor of the cabin are folded in a parallel array within a skirted roof member which functions both as an open-bottomed storage compartment for the cabin when in a folded state, and as a roof for the cabin when fully erected. Owing primarily to the fact that each of the four wall members are hinged directly to one of the four skirts which depend from the rectangularly shaped roof member, it is expedient to unfold the collapsed cabin packaged by simply elevating the skirted roof member to the position it assumes when the cabin is unfolded, and then lowering therefrom the wall and floor elements. To elevate the skirted roof member to a height sufficient for the walls to extend vertically downward therefrom, it is common to erect a makeshift supporting structure beneath the collapsed cabin package as it rests upon the automobile roof-rack. The package is then jacked up upon the supporting structure to the desired height which is ordinarily sufficient to permit the automobile to be driven from thereunder. Subsequent to removal of the automobile, the two side walls, are lowered to a vertical position and the floor member is dropped therebetween pulling with it a pair of folded end walls which are attached thereto and to the roof member. Finally, the cabin, now in an erected state, is lowered to the ground (usually only a distance of one or two inches) by adjusting the supporting structure accordingly.

In addition to being somewhat time consuming, the aforedescribed unfolding procedure presents a substantial safety problem in that, subsequent to the detachment of the folded cabin from the automobile roof rack, a weight of approximately three hundred pounds remains supported several feet above the ground by a relatively lightweight structure. Should the automobile happen to graze one of the members of the supporting structure as it is driven out from under the cabin prior to the erection procedure, or as it is driven under the cabin after the latter has been collapsed subsequent to use, the folded cabin is likely to fall upon the automobile or possibly upon personnel who happen to be in the immediate vicinity.

Furthermore, safety problems have been encountered in detaching the folded cabin from the automobile for storage purposes. Again, the folded cabin structure must be elevated on a support to a level such as to permit the automobile to be driven from thereunder. It is then necessary to manually lower the cabin from its elevated position to the ground so as to store it in a suitable location. Due to the weight and bulkiness of the cabin, this procedure is considerably hazardous and requires the concerted efforts of two or more people.

SUMMARY OF THE INVENTION

According to the preferred embodiment of the present invention a portable and foldable rigid-walled cabin is provided which, because of the unique manner in which the elements are folded, is adapted to overcome the aforedescribed problems associated with the prior art. In the preferred embodiment a cabin is provided which is adapted to be detached from an automobile roof-rack and erected by one person acting alone in a completely safe environment. Basically the invention comprises a foldable cabin which may be unfolded laterally from an end wall thereof rather than vertically from the roof member, as in the prior art. A laterally folding cabin makes possible lowering of the folded cabin package from the automobile roof to ground level prior to the erection procedure. Lowering of the folded cabin package prior to erection is impractical with prior art vertically folding cabins because, after the lowering procedure has been accomplished, it is still necessary to elevate the package several feet above ground level so as to permit the wall members to be lowered vertically from the roof member to which they are coupled.

It is therefore the primary object of the invention to provide a uniquely folding rigid-walled cabin.

Another object of the invention is to provide a foldable cabin which may be transported atop a standard-sized automobile when in a folded state and which may be detached therefrom and erected by one person acting alone in a completely safe environment.

Still another object of the invention is to provide a foldable rigid-walled cabin which may be laterally unfolded relative to one of the walls thereof.

These and other objects of the invention will be apparent from the following description thereof which is to be taken in connection with the drawings, in which similar reference characters indicate similar parts.

BRIEF DESCRIPTION OF THE DRAWINGS

FIG. 3 is a transverse sectional view of the preferred embodiment shown in FIG. 2 taken along line 3—3;

FIG. 4 is a longitudinal sectional view of the preferred embodiment shown in FIG. 3 taken along line 4—4;

DETAILED DESCRIPTION OF A PREFERRED EMBODIMENT

Figure 1:
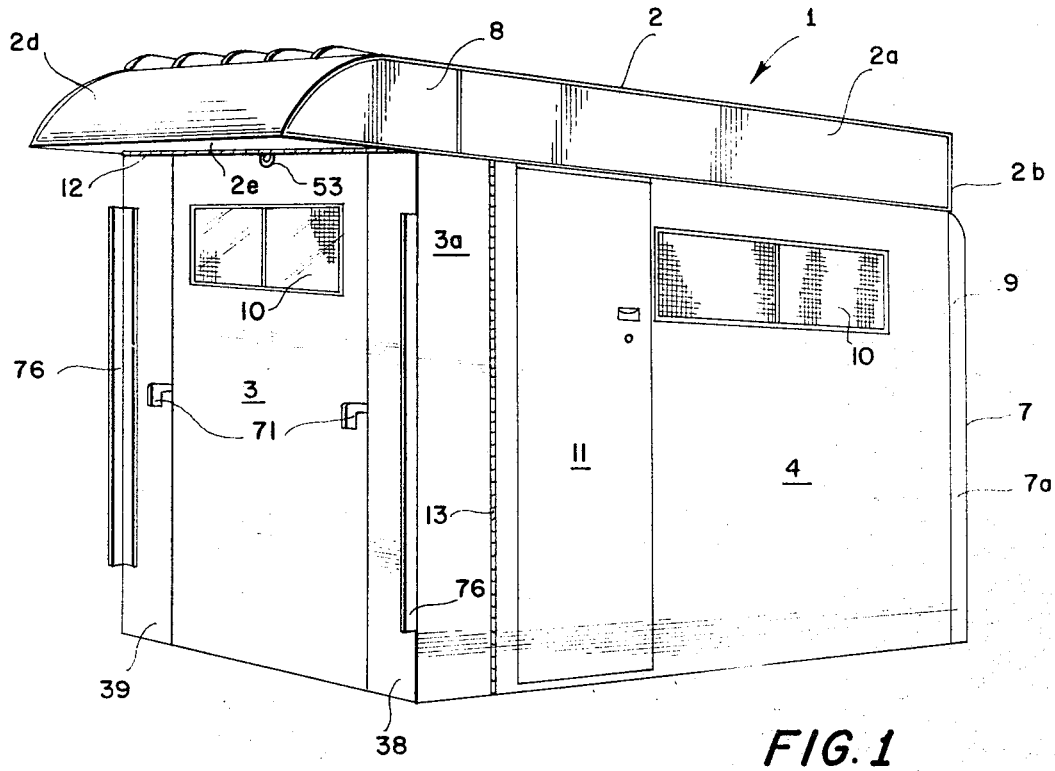
FIG. 1 is a perspective view showing a preferred embodiment in a totally unfolded condition.

Referring now to FIG. 1, the rigid-walled camping cabin 1 which comprises the preferred embodiment of the invention is shown in its totally unfolded condition. Typically, the internal dimensions of the cabin in such a condition are: seven feet high; six feet, three inches wide; and eight feet, six inches long. The cabin comprises the following major elements: (a) a skirted roof member 2; (b) a skirted front end wall 3; (c) a pair of side walls 4 and 5; (d) a floor member 6; and (e) a skirted rear end wall 7. Extending forward of the skirted front end wall 3 is a storage compartment 8 wherein general camping supplies (e.g., food, clothing, utensils, etc.) may be stored. Skirts 7a, 7b, 7c and 7d of rear end wall 7 define a storage compartment 9 (which typically measures four inches in depth) wherein the cabin furniture (beds, table, benches, etc.) may be stored in a folded condition. A detachable panel 7e is provided for retaining such furniture within the recessed portion. Optionally, windows 10 may be provided for purposes of cabin ventilation in any or all of walls 3, 4, and 5 and a door 11 is preferably provided in one of the side walls 4 or 5. All of the major cabin elements 2-7 are preferably constructed of plywood having overcoatings of fiber glass and resin, although any weatherproof rigid material (e.g., aluminum, plastic, etc.) will suffice. Plywood is preferred primarily because of its thermal insulating properties, its relative lightweight, its rigidity and its low-cost.

Depending vertically downward from the roof member 2 along three of the edges thereof are skirts 2a, 2b, and 2c. A fourth skirt 2d, arcuate in shape, extends outwardly and downwardly from the forward edge of roof member 2. Together with the foremost portions of skirts 2a and 2c, and panel 2e which extends laterally between the foremost edge of skirt 2d and end wall 3, skirt 2d defines the dimensions of the aforementioned storage compartment 8. Skirt 2d is arcuately shaped for purposes of streamlining the collapsed cabin package, thereby lowering the wind resistance thereof when transported atop an automobile.

As viewed in FIG. 1, the upper edge of end wall 3 is foldably coupled, by hinge 12, to the rear edge of panel 2e of roof member 2. Extending from the lateral edges and bottom edge of end wall 3 toward the rear of the cabin are skirts 3a, 3b, and 3c, respectively. Foldably coupled, by hinges 13, 14 and 15, to the rear edge of skirts 3a, 3b and 3c are first side wall 4, second side wall 5 and floor member 6, respectively. Thus, it is apparent that all major elements, with the exception of the skirted end wall 7, are directly coupled with skirted end wall 3. Notice, skirted end wall 7 is foldably coupled to the rear edge of floor member 6 by hinge 16.

Figure 2:
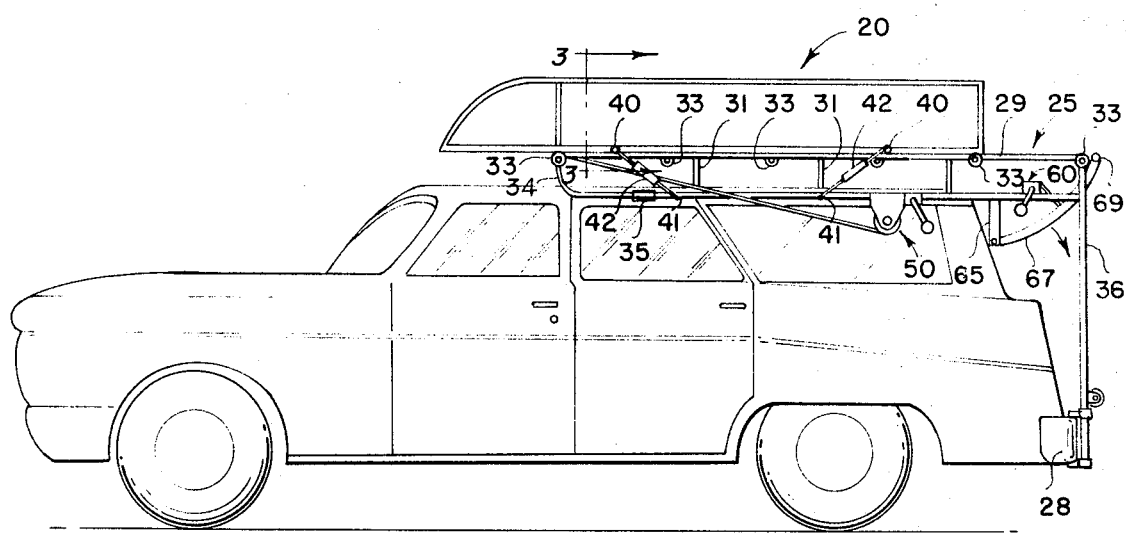
FIG. 2 is a side elevation showing the preferred embodiment in a totally folded condition atop an automobile roof-top rack.

When the cabin is in a folded state, as illustrated in FIGS. 2-4, walls 4, 5, and 7 and floor member 6 are folded about their respective hinges so as to be parallel with end wall 3 and the latter is folded about hinge 12 so as to be parallel with roof member 2. The skirts of roof member 2 overhang the skirts of end wall 3 so as to provide a compact package which for convenience is identified by reference numeral 20. The foremost surface of end wall 3, which constitutes the bottom of package 20, is provided with a pair of parallel metal skids 38, 39, shown in FIGS. 1 and 6, which are arranged to engage rollers 33 of rack 25 as described hereinafter. The thickness of package 20 is typically twelve inches as measured between the outer surfaces of roof 2 and end wall 3.

Figure 5:
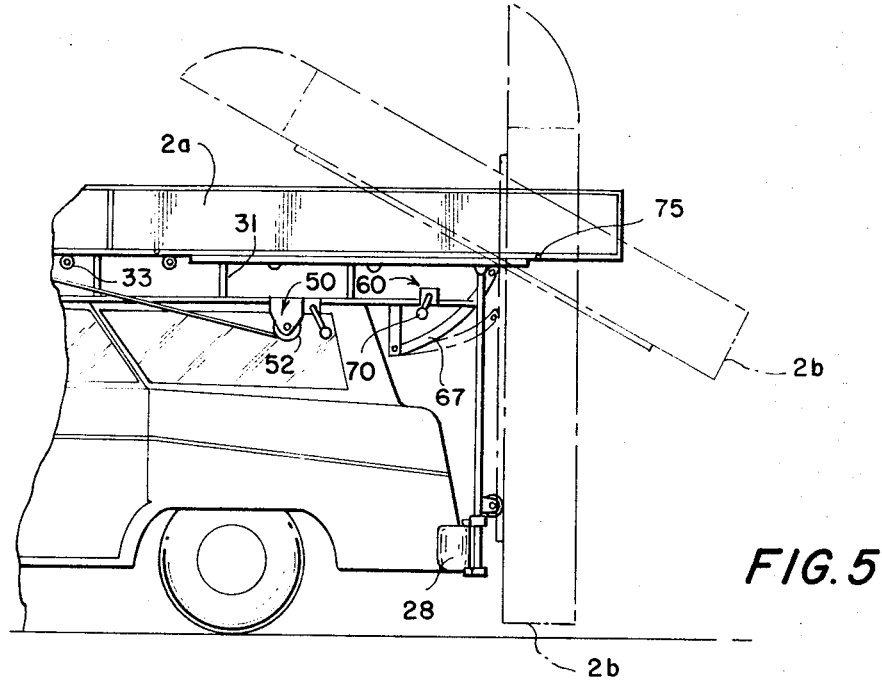
FIG. 5 is a side elevation of the preferred embodiment in a folded state showing, in phantom lines, the position thereof during various stages of the detachment procedure.

Referring particularly to FIGS. 4 and 5, package 20 is shown in a transverse and longitudinal cross section, respectively. As shown, the skirts 2a, 2b, 2c and 2d of roof member 2 depend to such an extent as to constitute the entire lateral sides of package 20. Owing to the recess 9 provided by skirts 7a, 7b, 7c and 7d, sufficient room is provided for mattresses, folding chairs, cots, etc. For clarity, recess 9 is shown having mattresses 77 stored therein. Roof member 2 is provided with several reinforcing struts 2e which add sufficient rigidity to the roof as to prevent it from sagging when the cabin is erected. Similarly, floor member 6 is provided with reinforcing struts 45 for rigidity and elevating cabin 1 slightly above ground level for insulation purposes. The lateral edges of end wall 3 are provided with angle iron strips 76 which prevent package 20 from shifting laterally when transported on an automobile roof rack of the type hereinafter described.

As shown in FIG. 4, a screw eye 53 is rigidly mounted in end wall 3. Screw eye 53 is employed during the procedure for detaching package 20 from roof-rack 25 as explained below. Also shown in FIG. 4 with more particularity than that shown in other drawings is the relative size of storage compartment 8.

The folded cabin package 20 is shown in FIG. 2 supported by a conventional automobile roof-top rack 25 which is specially equipped with apparatus for facilitating the procedure of lowering package 20 to ground level. Basically rack 25 comprises the following members: a first pair of parallel rails 26, 27 which stradles the automobile roof and preferably extends horizontally from the anterior portion of the roof to a point substantially vertical of the rear bumper 28 of the automobile; a second pair of parallel rails 29, 30 which extend substantially parallel and vertically above the rails 26, 27; a plurality of vertical struts 31 which interconnect rails 26 and 29, and rails 27 and 30; a plurality of horizontal struts 32 which interconnect rails 29 and 30 and serve to maintain the parallelism of all four rails; and a plurality of rollers 33 each of which are rotatably mounted on shafts 34 which extend laterally on rails 29, 30. The forward portion of rack 25 is attached to the lateral edges of automobile roof 19 by conventional mounting brackets 35, and the rear portion thereof is interconnected with bumper 28 by a pair of sturdy upright support members 36, 37. When the folded cabin package 20 is supported by rack 25, rollers 33 are in contact with a pair of parallel metal skids 38, 39 which are disposed flush with end wall 3 near the lateral edges thereof. Package 20 may be secured to rack 25 by the use of screw eyes 40 mounted on the anterior and posterior portions of skirts 2a and 2c, screw eyes 41 appropriately attached to rails 29, 30, and turnbuckles 42 which interconnect screw eyes 40 and 41.

Figure 6:
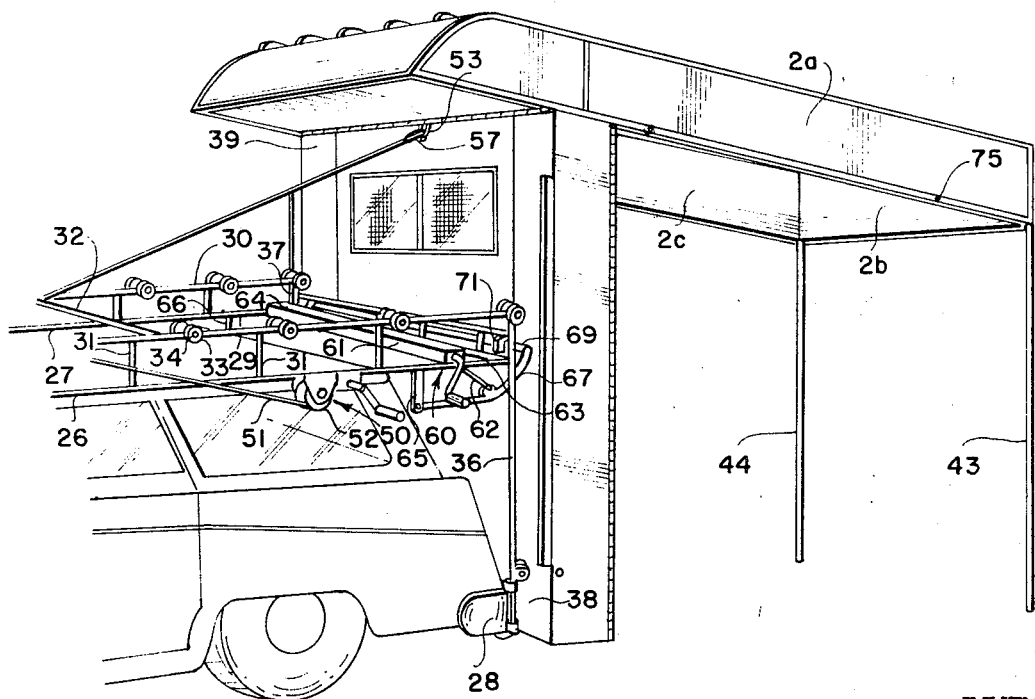
FIG. 6 is a perspective view of the preferred embodiment after completion of the first stage of the erection procedure.

Rack 25 is also provided with a pair of winching mechanisms which assist in the procedure of lowering package 20 from its elevated position on the roof-rack to ground level. Rigidly mounted to rail 26 is a conventional winching mechanism 50 which includes a cable 51. One end of cable 51 is wound upon the drum 52 of the winch 50 and the free end thereof is provided with a hook 57 which may engage a screw eye 53 which is rigidly mounted to end wall 3 which, of course, constitutes the bottom surface of package 20. Pulleys (not shown) swivelly mounted to the anterior of rail 29 and the midpoint of the foremost horizontal strut 32, respectively serve to guide cable 51 in such a manner as shown in FIG. 6. Winch 50 is also provided with a pawl and ratchet arrangement (not shown for clarity) which operates in a well known manner to prevent the unwinding of cable 51 from drum 52 when the pawl and ratchet are in engagement.

Rigidly mounted on the posterior portion of rail 26 is a second winching mechanism 60 which comprises, in part, a winding shaft 61 upon which a spaced pair of cables 62 may be wound. Shaft 61 is rotatably mounted between a pair of support members 63, 64 which extend from rails 26, 27. Also depending from rails 26, 27, forward of support members 63, 64, is a pair of rigid braces 65, 66. Pivotally mounted to braces 65, 66 are arms 67, 68, respectively. Arm 68 is hidden from view by the automobile roof in FIG. 6. Extending horizontally between the free ends of arms 67, 68 is a lowering bar 69 which may be raised and lowered as arms 67, 68 are pivoted. One end of each cable 62 is wound upon shaft 61 and the free end thereof is secured to arms 67, 68. Thus, a pivotal movement of arms 67, 68 may be accomplished by rotating shaft 61, which may be rotated by manually turning crank handle 70 which is rigidly coupled therewith. Ratchet means, not shown, are provided for locking the position of shaft 61 so as to prevent any undesired rotational movement thereof. Lowering bar 69 cooperates with a pair of brackets 71 mounted to wall 3 for varying the vertical position of package 20.

In FIGS. 5–10 the procedure for dismounting package 20 from rack 25 and unfolding cabin 1 therefrom is illustrated. After removing turnbuckles 42 from screw eyes 40 and 41, hook 57 is fastened to screw eye 53 on end wall 3. The pawl and ratchet arrangement of winch 50 is then disengaged so as to permit drum 52 to rotate freely. Package 20 is then slid horizontally upon rollers 33 to the position shown in solid lines in FIG. 5. Then cable 51 is slackened to such an extent that, when the excess slack is removed by further backward movement of package 20, the center of gravity of package 20 is in a position slightly to the rear of lowering bar 69. Then the pawl and ratchet arrangement of winch 50 is activated so as to prevent further unwinding of cable 51. Package 20 is then slid backward, thereby taking up some of the excess slack in cable 51, to such an extent that brackets 71 engage lowering bar 69. Package 20 is then tilted about bar 69 to approximately a 45-degree angle at which point cable 51 becomes taut. Further tilting of package 20 to a vertical position, as shown in phantom lines in FIG. 5, is accomplished by unwinding cable 51 in a well known manner. Lowering of package 20 in a vertical position is accomplished merely by rotating crank handle 70 in the appropriate direction so as to unwind cable 62 from shaft 61. Preferably, package 20 is lowered to such an extent that it is supported two or three inches above the ground. In this position the unfolding procedure is facilitated.

Figure 7:
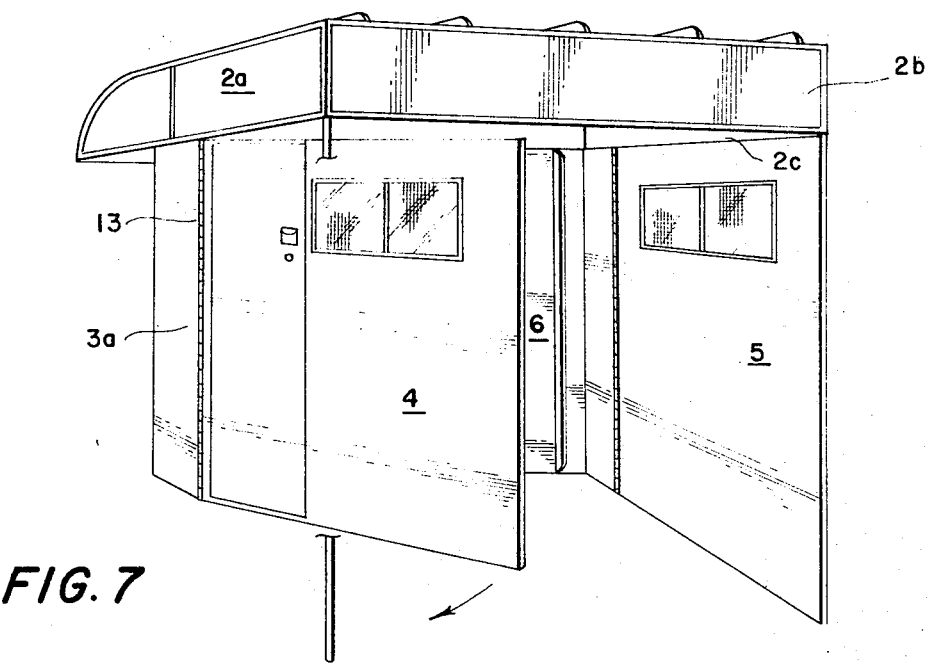
FIG. 7 is a perspective view of the preferred embodiment showing the manner in which the side walls thereof are foldably coupled with the skirted end wall.
Figure 8:
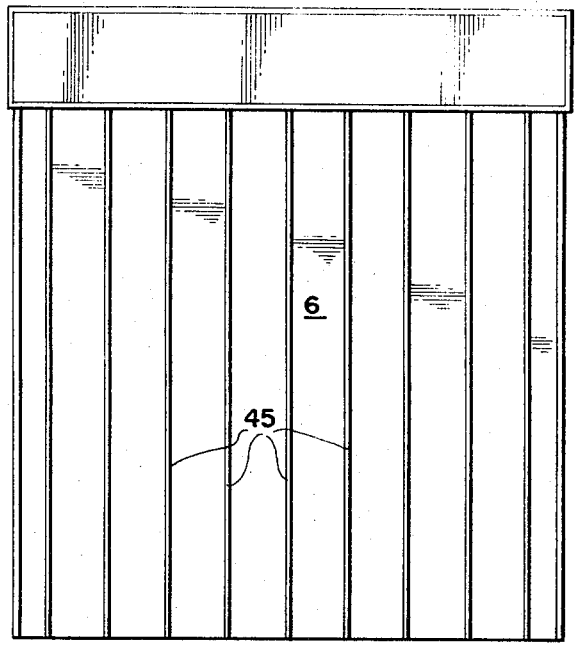
FIG. 8 is an end elevation of the preferred embodiment subsequent to the unfolding of the side walls and prior to the lowering of the floor member.
Figure 9:
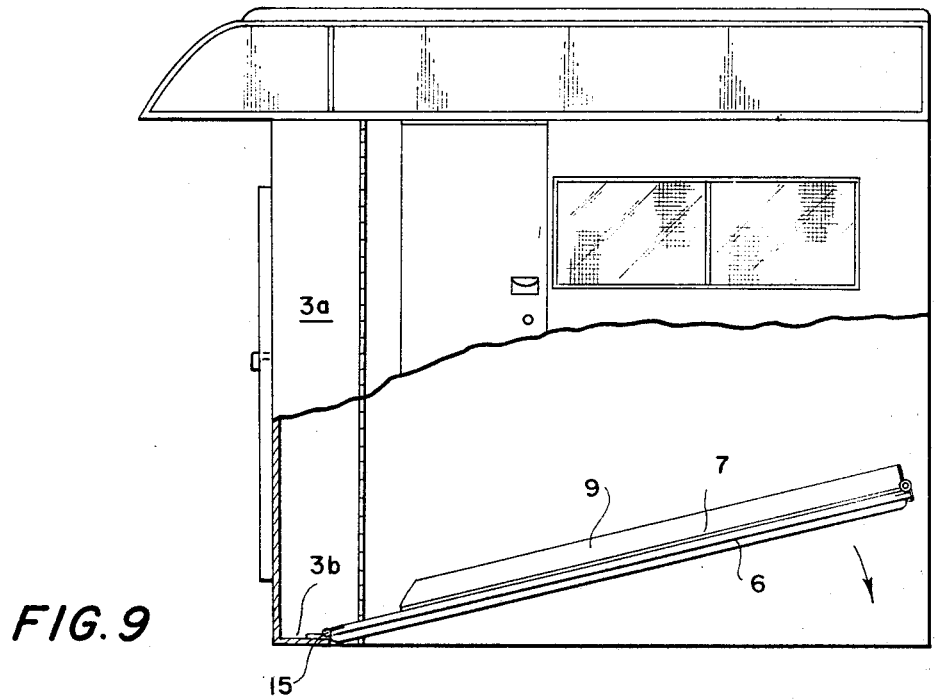
FIGS. 9 and 10 are partial cross-sectional side elevations of the preferred embodiment showing the floor member being lowered into a horizontal position and the second end wall being raised from a horizontal to a vertical position.
Figure 10:
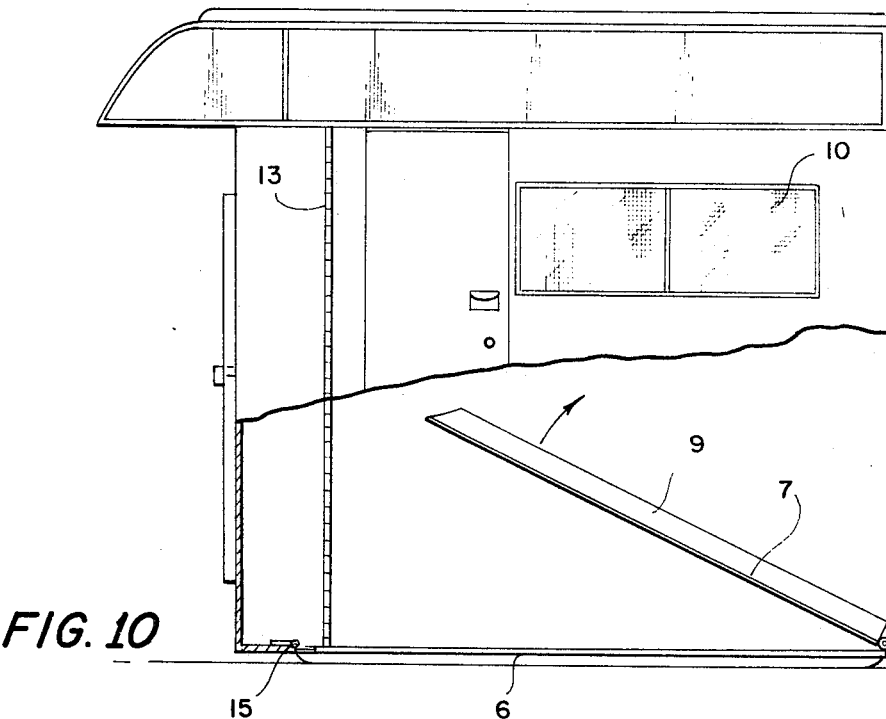

Referring now to FIG. 6, the first step of the unfolding procedure is depicted. After releasing locking member 75 so as to permit roof member 2 to pivot about hinge 12, roof member 2 is raised to a nearly horizontal position (not horizontal since package 20 is slightly above ground level) and temporarily maintained in that position by a pair of posts 43, 44 which are pivotally mounted to skirt 2b. Then side wall 5 is unfolded to a position in which it parallels skirt 2c of roof 2 and is fastened thereto by screw means (not shown). Side wall 4 is similarly unfolded, as shown in FIG. 7, and fastened to skirt 2a. Subsequent to unfolding of side walls 4 and 5, floor member 6 is lowered between the side walls from a vertical to horizontal position, as shown in FIG. 9. Floor member 6 is provided with a plurality of equally spaced skids 45, constructed of aluminum or the like. Skids 45 extend longitudinally and serve to add rigidity to floor member 6 and to elevate cabin 1 approximately one and one-half inches above ground level for insulating and moisture-proofing purposes. When floor member 6 is in a substantially horizontal position, end wall 7 may be unfolded on hinge 16 to its vertical position and fastened to skirt 2b. The lowering bar 69 is then lowered to an extent as to permit the floor member 6 to rest entirely on the ground.

To convert cabin 1 into package 20 and mount the latter atop roof-rack 25, the aforementioned procedure is merely reversed.

From the foregoing description it is apparent that the invention has obvious advantages over the prior art. Owing to the unique manner in which the elements are folded (i.e., one wall having two adjacent walls, the floor and the roof directly coupled thereto), the collapsed cabin package may be moved into a safe position prior to the commencement of the unfolding procedure. Since the unfolding procedure, may be performed in a lateral direction, it is substantially free of the safety hazards associated with the prior art folding cabins.

Although the invention has been described in detail with particular reference to a preferred embodiment, it should be understood that many modifications may be made thereto within the spirit and scope of the invention. For instance, the sequence in which the wall, roof and floor element are folded relative to the skirted end wall may be varied within the scope of the invention.

What is claimed is:

1. A folding rigid walled cabin capable of being transported atop a vehicle in folded state comprising:
a roof member; a floor member; first and second rigid end walls; means for foldably coupling said first end wall with said roof and floor members; means for foldably coupling one end of said second end wall with said floor member; means for attaching another end of said second wall to said roof member; first and second side walls; and means for foldably coupling said side walls with said first end wall, wherein said first end wall comprises a rigid, rectangularly shaped panel having first, second and third skirt members extending substantially normal thereto along three edges thereof, said first skirt member having means for pivotally engaging said first side wall, said second skirt member having means for pivotally engaging said second side wall, and said third skirt member having means for pivotally engaging said floor member.

2. The rigid walled cabin structure of claim 1, wherein the floor member supports the entire structure.

3. The invention according to claim 1 wherein said roof member is provided with depending skirt members within which said walls and floor member may be folded so as to provide a compact package.

4. The invention according to claim 1 wherein said second end wall is provided with a recessed portion wherein cabin furniture may be foldably stored.

5. The invention according to claim 1 wherein at least one of said walls is provided with means defining an entrance aperture.

6. A method of assembling a rigid walled cabin comprised of a roof member having a pair of side skirts and a rear skirt, first and second end walls, first and second side walls and a floor member, each suitably hinged to another, comprising the steps of: (1) lowering the base of first said end wall to contact the ground, (2) pivoting the roof member along the upper horizontal edge of said first end wall to a nearly horizontal position, (3) placing a temporary support member under the rear of said roof member, (4) pivoting a first side wall to contact one side skirt of said roof member, (5) rigidly fastening said first side wall to said roof skirt member, (6) pivoting a second side wall to contact a second side skirt member of said roof member, (7) rigidly fastening said second side wall to said second side skirt, (8) lowering and pivoting a floor member from said first end wall to contact the ground, (9) pivoting said second end wall from said floor member to contact the rear skirt of said roof member and rigidly fastening said second end wall to said rear skirt member of said roof member, wherein substantially all the weight of the rigid walled cabin structure rests on said first end wall during the assembly of said rigid walled cabin.

7. A folding rigid-walled cabin capable of being transported atop a vehicle in folded state, comprising:

a skirted roof member which functions as an open-bottomed storage compartment when the cabin is in a folded state and as a roof with first, second and third skirts when the cabin is erected, said skirted roof member containing in ascending sequence, when said cabin is in a folded state, a first end wall foldably coupled with said skirted roof member; a second end wall; a floor member foldably coupled with said first and second end walls; a first side wall foldably coupled with said first end wall; means for attaching another end of said second wall to said roof member and a second side wall foldably coupled with said first end wall, wherein said first end wall comprises a rigid, rectangularly shaped panel having first, second and third skirt members extending substantially normal thereto along three edges thereof, said first skirt member on the end wall having means for pivotally engaging said first side wall, said second skirt member on the end wall having means for pivotally engaging said second side wall, and said third skirt member on the end wall having means for pivotally engaging said floor member.

References Cited

UNITED STATES PATENTS

| | | | |
|---|---|---|---|
| 2,670,986 | 3/1954 | Presnell | 296—27 X |
| 2,710,977 | 6/1955 | Fannin | 296—23 X |
| 3,283,452 | 11/1966 | Hayes | 296—23 X |
| 1,156,693 | 10/1915 | Koger | 296—23.7 X |

PHILIP GOODMAN, Primary Examiner

U.S. Cl. X.R.

296—23; 52—66